UNITED STATES PATENT OFFICE.

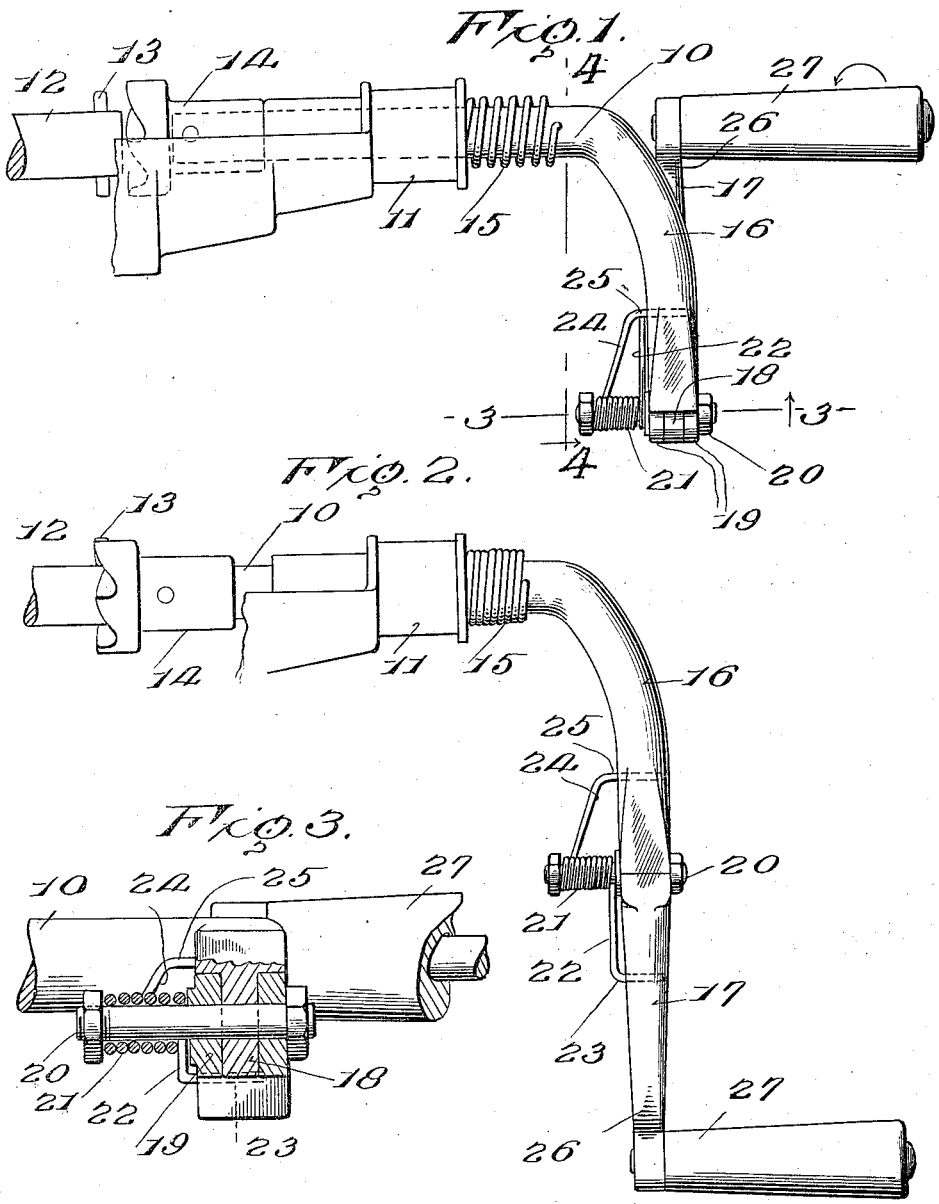

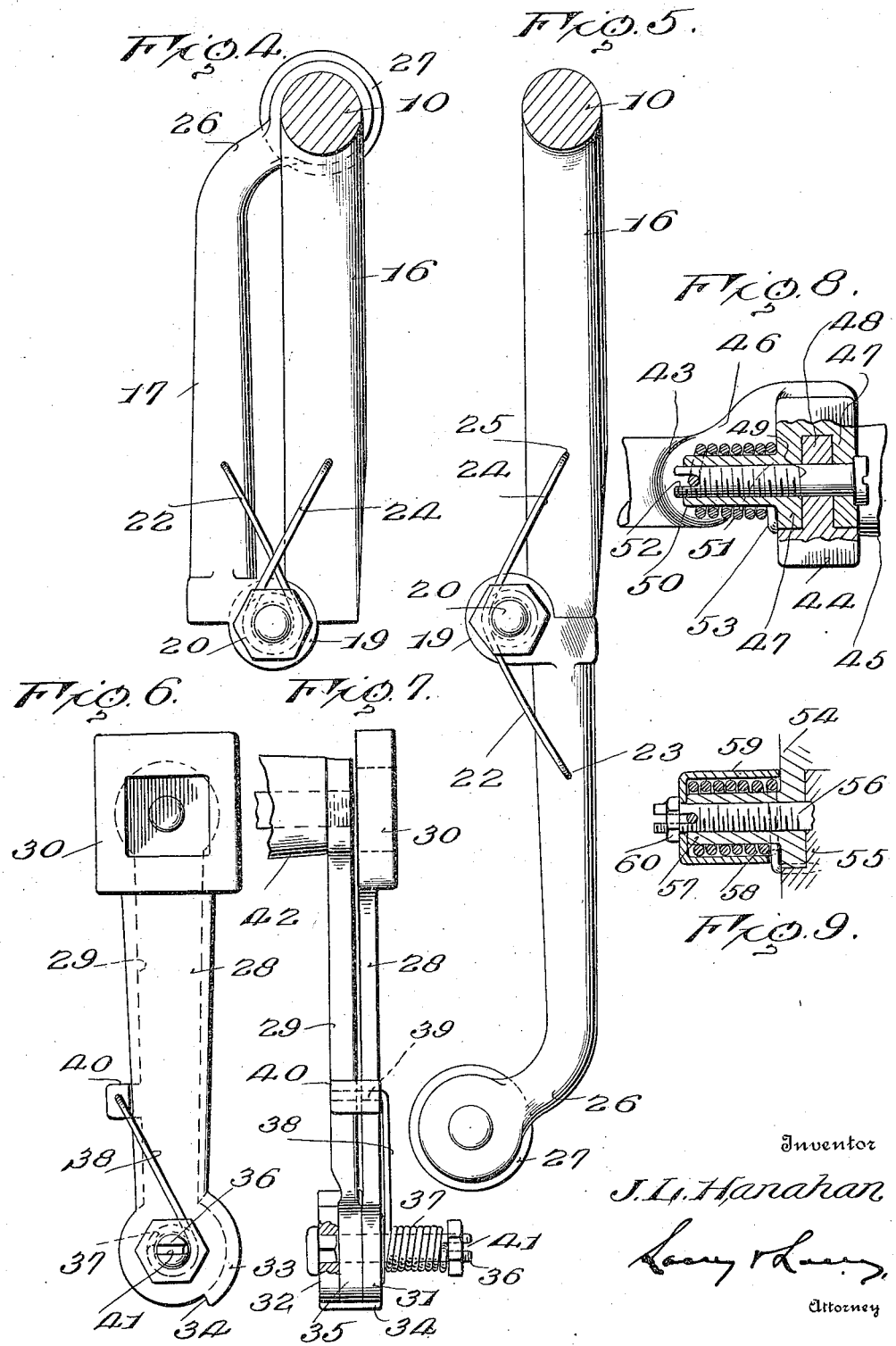

JAMES L. HANAHAN, OF COLUMBIA, SOUTH CAROLINA.

STARTING-CRANK FOR MOTOR-VEHICLES.

1,300,384.

Specification of Letters Patent.

Patented Apr. 15, 1919.

Application filed April 13, 1918. Serial No. 228,415.

*To all whom it may concern:*

Be it known that I, JAMES L. HANAHAN, citizen of the United States, residing at Columbia, in the county of Richland and State of South Carolina, have invented certain new and useful Improvements in Starting-Cranks for Motor-Vehicles, of which the following is a specification.

This invention relates to an improved safety crank for motor vehicle engines and has as its primary object to provide a device of this character designed to minimize the danger of being struck by the crank or otherwise injured thereby upon back firing of the engine.

The invention has as a further object to provide a crank having the crank arm thereof formed of sections and wherein, upon back firing of the engine and release of the crank handle by the operator, the outer section of the crank arm will be automatically folded inwardly upon the inner section thereof shifting the crank handle to a position axially of the crank shaft so that the crank arm will not, when counter-rotated, strike the forearm or hand of the operator.

And the invention has as a still further object to provide a crank which may be employed in connection with substantially any conventional type of motor vehicle.

Other and incidental objects will appear as the description proceeds. In the drawings wherein I have illustrated the preferred embodiment of the invention, and wherein similar reference characters designate corresponding parts throughout the several views:

Figure 1 is a fragmentary side elevation showing my improved crank in connection with a conventional type of guide sleeve therefor and motor vehicle engine crank shaft, the arm of the crank being illustrated in its normal folded position.

Fig. 2 is a similar view showing the arm of the crank extended for cranking the engine, Fig. 3 is a fragmentary sectional view taken on the line 3—3 of Fig. 1 and looking in the direction of the arrows, this view particularly showing the mounting of the spring employed for normally holding the sections of the crank arm folded, Fig. 4 is a vertical sectional view taken on the line 4—4 of Fig. 1 and looking in the direction of the arrows, this view particularly showing the sections of the crank arm folded, Fig. 5 is a view similar to Fig. 4 showing the sections of the crank arm extended, Fig. 6 is a rear elevation showing a slightly modified form of crank, Fig. 7 is an edge elevation of the crank illustrated in Fig. 6, Fig. 8 is a fragmentary sectional view showing a modified form of hinge connection between the sections of the crank arm, and Fig. 9 is a fragmentary sectional view showing a further modification similar to that shown in Fig. 8.

In its preferred embodiment my improved crank includes a shaft 10 and in Figs. 1 and 2 of the drawings, I have shown this shaft as slidably fitted through a supporting sleeve 11 for the crank, this sleeve being a part of the usual construction of a well known type of motor vehicle. The forward terminal of the vehicle engine crank shaft is shown at 12 and this shaft is equipped with a usual pin 13. Fixed upon the inner terminal of the shaft 10 of the crank is a ratchet 14 adapted for engagement with the said pin and surrounding the outer extremity of the said shaft is a helical spring 15 bearing against the end of the sleeve 11 for normally holding the ratchet away from the crank shaft 12. At its outer extremity the shaft 10 of the crank is directed laterally to provide a crank arm which is formed of an inner section 16 curved laterally from the shaft 10 and an outer section 17 of a length substantially equal to that of the former section. At its outer terminal the section 16 is provided with a laterally directed hinge lug 18 while the inner terminal of the section 17 is formed with spaced lugs 19 for receiving the lug 18 therebetween and connecting these lugs is a transverse pivot bolt or pin 20, the joint thus formed being of the stop hinge type. As particularly shown in Fig. 3 of the drawings, the bolt 20 projects laterally at the inner side of the crank arm and fitted around the projecting extremity of the said bolt is a helical spring 21. The inner end of this spring is extended to provide a spring arm 22 provided at its outer extremity with a laterally directed terminal 23 engaging within a suitable opening in the inner side of the section 17 of the crank arm. The outer extremity of the spring 21 is extended in a similar manner to provide a spring arm 24 provided at its outer extremity with a laterally directed terminal 25 engaging within a suitable opening in the inner side of the section 16. The arms 22 and 24 of the spring will thus constantly tend to fold the outer section 17 of the crank arm inwardly upon the section 16 and normally hold the said sections, as shown in Figs. 1 and 5 of the drawings, in overlapping folded position. At its outer end the section 17 is formed with a laterally and forwardly directed terminal 26 adapted to extend in front of the inner terminal of the section 16 of the crank arm, when the said sections are folded, intersecting the axis of the shaft 10 of the crank. This terminal 26 carries a suitable handle 27 which will thus be supported, when the sections of the crank arm are folded, at the inner end of the section 16 extending axially of the shaft 10 of the crank.

Referring now more particularly to Figs. 1 and 2 of the drawings, it will be seen that the handle 27 of the crank may be grasped when, by pushing inwardly thereon, the ratchet 14 of the crank may, as shown in Fig. 2, be engaged with the pin 13 of the engine crank shaft 12. The handle 27 is then swung, in the usual manner, in a clockwise direction, when the resistance offered by the engine crank shaft will serve to hold the shaft 10 of the crank against turning movement sufficiently to overcome the tension of the spring 21 so that the section 17 of the arm will thus be swung against the tension of the said spring into alinement with the section 16, as shown in Fig. 5, rigidly coacting therewith. Continued swinging movement of the handle 27 will consequently effect the rotation of the engine shaft 12 and the cranking of the engine. This accomplished, the spring 21 will immediately act, upon the release of the handle, to again fold the section 17 of the crank arm inwardly upon the section 16, as shown in Fig. 1 and so support the outer section of the crank free of any ordinary obstruction in the roadway.

Assuming now that the vehicle engine back fires during the cranking operation as just previously described, a sudden impulse, tending to counter-rotate the crank will, as will be well understood, be communicated thereto. Such sudden impulse will, of course, tend to jerk the crank handle from the hand of the operator when, upon the release of the handle, the spring 21 will immediately act to fold the outer section 17 of the crank arm inwardly upon the inner section 16 thereof, to dispose the handle of the crank axially of the shaft 10. This folding of the outer section upon the inner section will, as will be seen, occur very quickly after the crank handle has been released so that before the crank has described a complete counter-revolution to strike the hand or forearm of the operator, the outer section of said arm will be retracted inwardly upon the inner section. Consequently, the folded sections of the crank arm may swing in a retrograde direction without likelihood of injury to the operator.

In Figs. 6 and 7 of the drawings I have illustrated a somewhat modified form of the invention embodying a crank particularly adapted for use upon motor trucks wherein the crank is normally detached. In these figures the inner section of the crank arm is shown at 28 and the outer section at 29. These sections are flat and lie face to face. Formed at the outer end of the inner section is a squared socket member 30 adapted to engage over the outer end of an engine crank shaft. At its inner end this inner section is formed with a hinge lug 31 overlying which is a second hinge lug 32 joined with the lug 31 by a connecting web 33 which, at its outer end is formed into a stop shoulder 34. Formed on the inner end of the section 29 of the crank arm is a hinge lug 35 received between and mating with the lugs 31 and 32. Fitted through these lugs and connecting the sections of the crank arm is a pivot bolt or pin 36 projecting laterally at the inner side of the crank arm and carrying a helical spring 37. The inner end of this spring is extended to form a spring arm 38 provided with a laterally directed terminal 39 engaging within a suitable opening in a laterally extending lug 40 formed on the adjacent side edge of the outer section 29 of the crank arm. At its outer terminal the spring is fitted through a suitable slot 41 in the outer end of the pivot bolt 36 and is held to engage within the said slot by the nut of the bolt which overlies said terminal. Thus the spring is connected with the pivot bolt and in this connection it will be noted that the said bolt is formed with a squared inner end and is thus held against rotation with respect to the inner section 28 of the arm. Consequently, the spring will, by its arm 38, act to swing the outer section inwardly upon the inner section of the crank arm and normally hold the sections in folded overlapping relation. Outward movement of the section 29 upon the section 28 is, of course, defined by the stop lug 34 which is adapted to engage the inner section for limiting the said outer section in extended position disposed in alinement with the inner section of the arm. At its outer end the section 29 is equipped with a handle 42 and when the sections are folded it will be noted that this handle is disposed opposite the inner end of the inner section of the crank arm and will thus occupy a position axially of the engine crank shaft when the crank arm is attached thereto. The construction of this modification being thus described, it is believed, in view of the description as to the operation of the preferred embodiment of the invention, that an explanation concerning the operation of the modified structure is unnecessary.

In Fig. 8 of the drawings I have illustrated a slightly modified form of hinge connection between the inner and outer sections of the crank arm. In this figure the inner section of the crank arm is indicated at 43, and the outer section at 44. This latter section at its inner end carries a handle 45. The section 43 of the crank arm is at its outer end, formed with a laterally and forwardly directed offset 46 at the outer terminal of which are formed spaced lateral hinge lugs 47 lying in a plane with the said section of the arm but supported by the said offset in front of the section. At its inner end the section 44 is formed with a hinge lug 48 mating with the hinge lugs 47 and connecting these hinge lugs is a pivot bolt or pin 49, the joint thus formed being of the stop hinge type. In this connection it will be noted that the offset 46 and lugs 47 will thus support the outer section of the crank arm to fold in front of the inner section of the said arm. Formed on the outer side of the innermost lug 47 of the section 43 is an axial boss or sleeve 50 projecting at the inner side of the crank arm. This sleeve is internally threaded to receive the bolt 49 and fitted around the sleeve is a helical spring 51. The outer terminal of the said spring is engaged within suitable registering notches 52 formed in the outer terminal of the bolt and the adjacent end edge of the sleeve for thus locking the bolt against retrograde movement as well as connecting the spring with the inner section 43 of the crank arm. At its inner end the spring is extended to provide a spring arm 53 having a laterally directed terminal engaging with the inner side of the outer section of the crank arm in a manner similar to the construction illustrated in connection with the preferred embodiment of the invention. Thus it will be seen that the spring 51 will act through its arm 53 to yieldingly fold the outer section 44 of the crank arm inwardly upon the inner section and normally hold said outer section so folded.

In Fig. 9 of the drawings I have illustrated a still further modification of the invention which is similar to that shown in Fig. 8. In this figure the inner section of the crank arm is indicated at 54 and the outer section at 55. These sections are similar to the sections 43 and 44 of the modification shown in Fig. 8 and are connected by a pivot bolt or pin 56 threaded through a lateral sleeve 57 projecting from the inner side of the section 54 and corresponding to the sleeve 50 of the prior modification. Surrounding this sleeve is a helical spring 58 corresponding to the spring 51 and engaged at one end in suitable registering slots formed in the outer end of the sleeve and pivot bolt while the inner extremity of the said spring is extended to provide a spring arm having a laterally directed terminal engaged with the outer section 55 of the crank arm. Fitted over the said spring and receiving the pivot bolt through the outer end thereof is a housing cap 59 slotted at its inner edge to freely receive the spring arm of the spring 58 therethrough and held in position by a nut 60 threaded upon the outer terminal of the pivot bolt. This cap will thus inclose the spring and protect the said spring from the weather. Otherwise, this modification is identical with the construction of the prior modification.

Having thus described the invention, what is claimed as new is:

1. A starting crank for internal combustion engines including a crank formed of pivotally connected inner and outer sections, a handle carried by the outer section, the outer section being movable to active position rigidly coacting with the inner section and to inactive position folded upon the inner section, and yieldable means constantly tending to fold the outer section.

2. A starting crank for internal combustion engines including a crank arm formed of pivotally connected sections, one of the sections being movable to active position rigidly coacting with another of said sections and being foldable to inactive position with respect thereto, and means constantly tending to fold said first mentioned section.

3. A starting crank for internal combustion engines including a crank arm formed of complemental inner and outer sections, means swingingly connecting said sections at their meeting ends and supporting the outer section for movement to aline with the inner section rigidly coacting therewith, a handle carried by the outer section and movable therewith to occupy a position opposite the inner end of the crank arm, and means constantly tending to fold the outer section upon the inner section.

4. A starting crank for internal combustion engines including a crank arm formed of pivotally connected sections provided one with a handle, said sections being extensible to rigidly coact with each other and being foldable to a position with the said handle disposed opposite the inner end of the crank arm, and yieldable means constantly urging the sections to folded position.

5. A starting crank for internal combustion engines including a crank arm formed of pivotally connected sections provided one with a handle, said sections being extensible to rigidly coact with each other and being foldable to overlapping position, and yieldable means mounted at the joint between the sections and acting thereon for constantly urging the sections to folded position.

6. A starting crank for internal combustion engines including a crank arm formed of complemental sections provided one with a handle, means pivotally connecting said sections, the sections being extensible to rigidly coact with each other and being foldable to overlapping position, and yieldable means mounted upon the said first mentioned means and having its ends engaging with the sections for constantly urging the said sections to folded position.

7. A starting crank for internal combustion engines including a shaft, a crank arm extending laterally from the said shaft and formed of pivotally connected inner and outer sections, a handle carried by the outer section of the said arm, the said outer section being movable to active position rigidly coacting with the inner section of the arm and being foldable upon the said inner section to inactive position, and means constantly tending to fold the outer section upon the inner section.

8. A starting crank for internal combustion engines including a sectional crank arm having one of its sections foldable for reducing the effective length of said arm, and means tending to fold said section.

In testimony whereof I affix my signature.

JAMES L. HANAHAN. [L. s.]

Copies of this patent may be obtained for five cents each, by addressing the "Commissioner of Patents, Washington, D. C."